(12) United States Patent
Pope

(10) Patent No.: US 8,248,260 B1
(45) Date of Patent: Aug. 21, 2012

(54) ELECTRICAL SAFETY DEVICE FOR TEMPERATURE CONTROL AND MECHANICAL DAMAGE

(76) Inventor: Ralph E. Pope, Cumming, GA (US)

(*) Notice: Subject to any disclaimer, the term of this patent is extended or adjusted under 35 U.S.C. 154(b) by 601 days.

(21) Appl. No.: 12/460,370

(22) Filed: Jul. 20, 2009

(51) Int. Cl.
*G08B 21/00* (2006.01)
(52) U.S. Cl. ......... 340/657; 340/650; 340/651; 340/662
(58) Field of Classification Search .................. 340/657, 340/650, 651, 652, 662, 664, 588; 361/103, 361/106
See application file for complete search history.

(56) References Cited

U.S. PATENT DOCUMENTS

| | | | |
|---|---|---|---|
| 5,541,803 A | 7/1996 | Pope et al. | |
| 6,429,777 B1 * | 8/2002 | Boyden | 340/584 |
| 6,512,444 B1 | 1/2003 | Morris et al. | |
| 6,559,437 B1 | 5/2003 | Pope et al. | |
| 6,727,821 B2 * | 4/2004 | Weekes et al. | 340/588 |
| 6,801,117 B2 | 10/2004 | Morris et al. | |
| RE38,714 E | 3/2005 | Pope, Jr. et al. | |

* cited by examiner

*Primary Examiner* — Toan N Pham
(74) *Attorney, Agent, or Firm* — William B Noll

(57) ABSTRACT

An electrical tripping mechanism for protecting an electrical device from mechanical and over temperature problems. The tripping mechanism includes a copper conductor encased within an insulative layer, where the insulative layer is provided with a helically wound metallic strip amenable to easy tearing when subjected to mechanical damage. When the continuity of the strip is broken, a sensor detects the damage and shuts-down the electrical device.

5 Claims, 13 Drawing Sheets

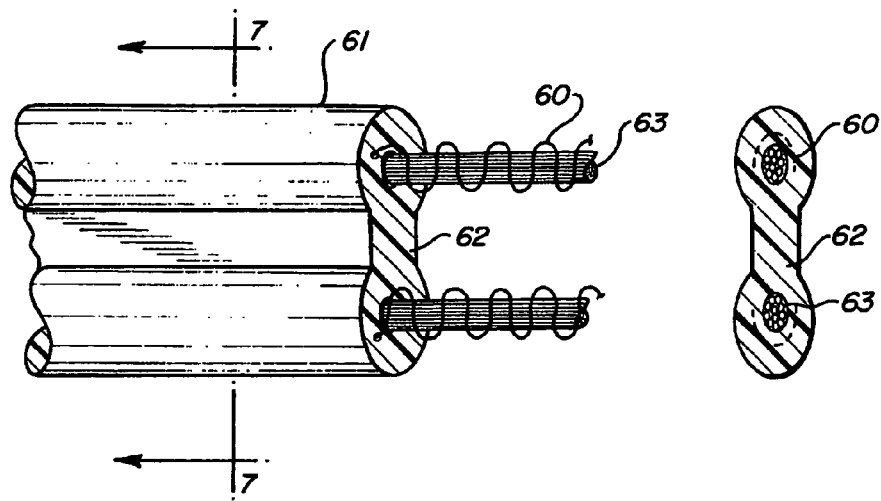
Fig. 6
PRIOR ART
Fig. 7
PRIOR ART
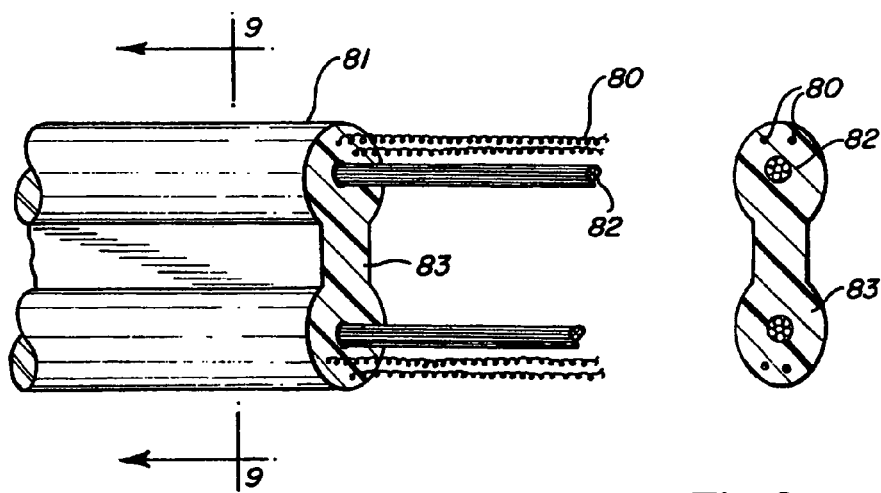
Fig. 8
PRIOR ART
Fig. 9
PRIOR ART

Fig. 10
PRIOR ART
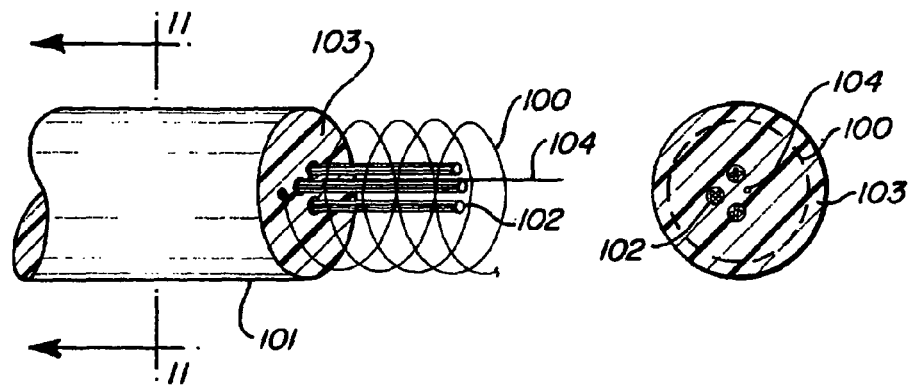
Fig. 11
PRIOR ART
Fig. 12
PRIOR ART
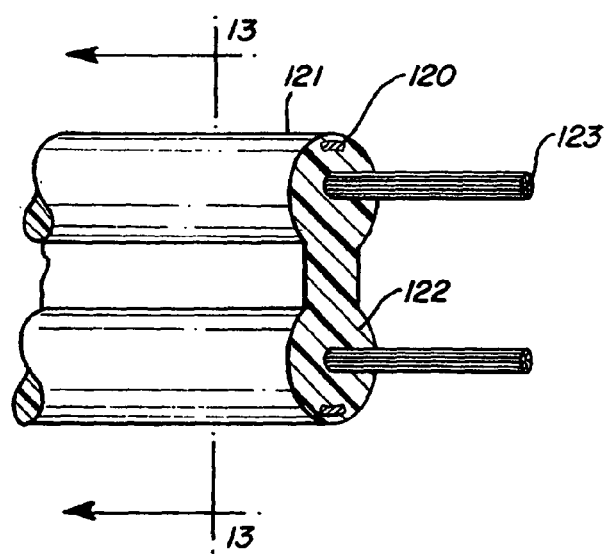
Fig. 13
PRIOR ART
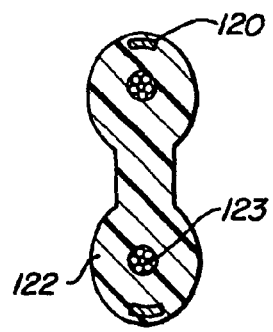

Fig. 14
PRIOR ART
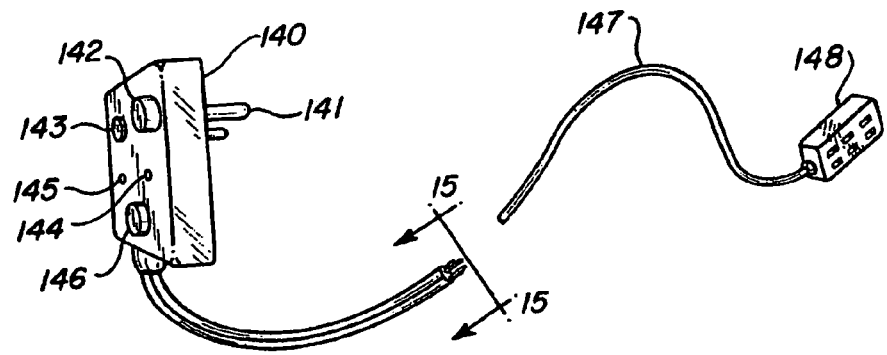
Fig. 15
PRIOR ART
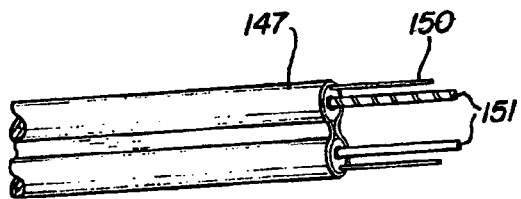
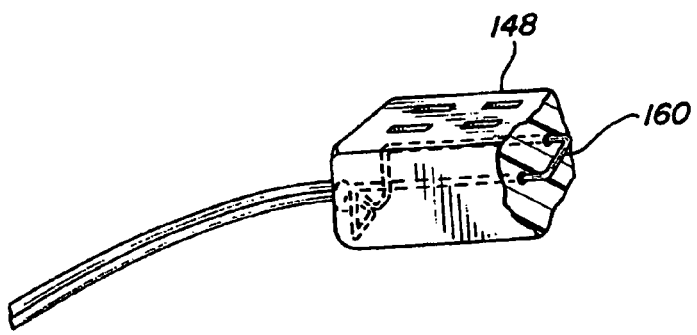
Fig. 16
PRIOR ART

Fig. 17
PRIOR ART
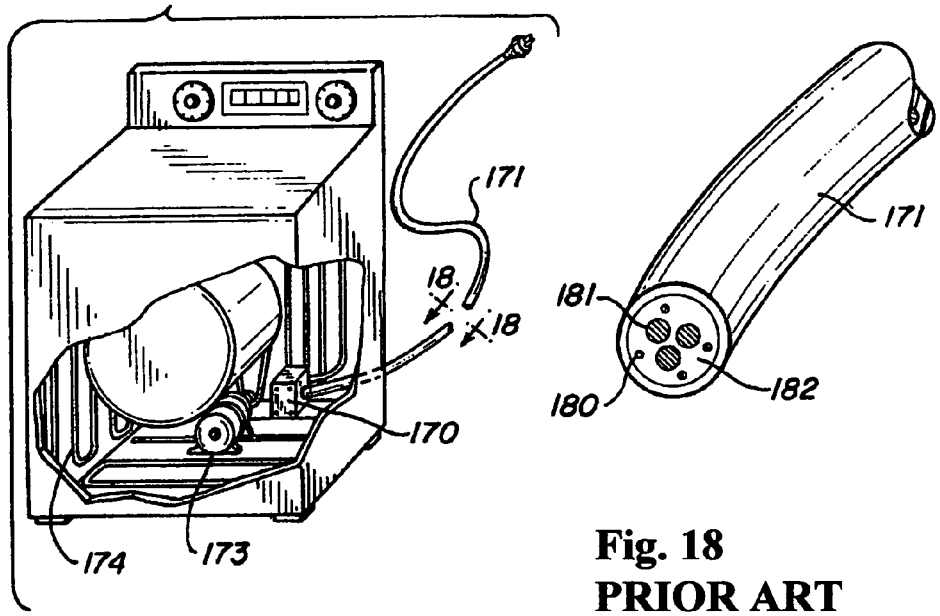
Fig. 18
PRIOR ART
Fig. 19
PRIOR ART
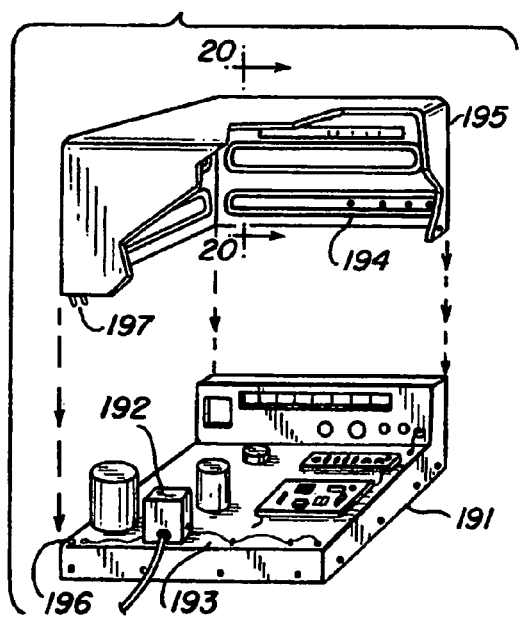
Fig. 20
PRIOR ART

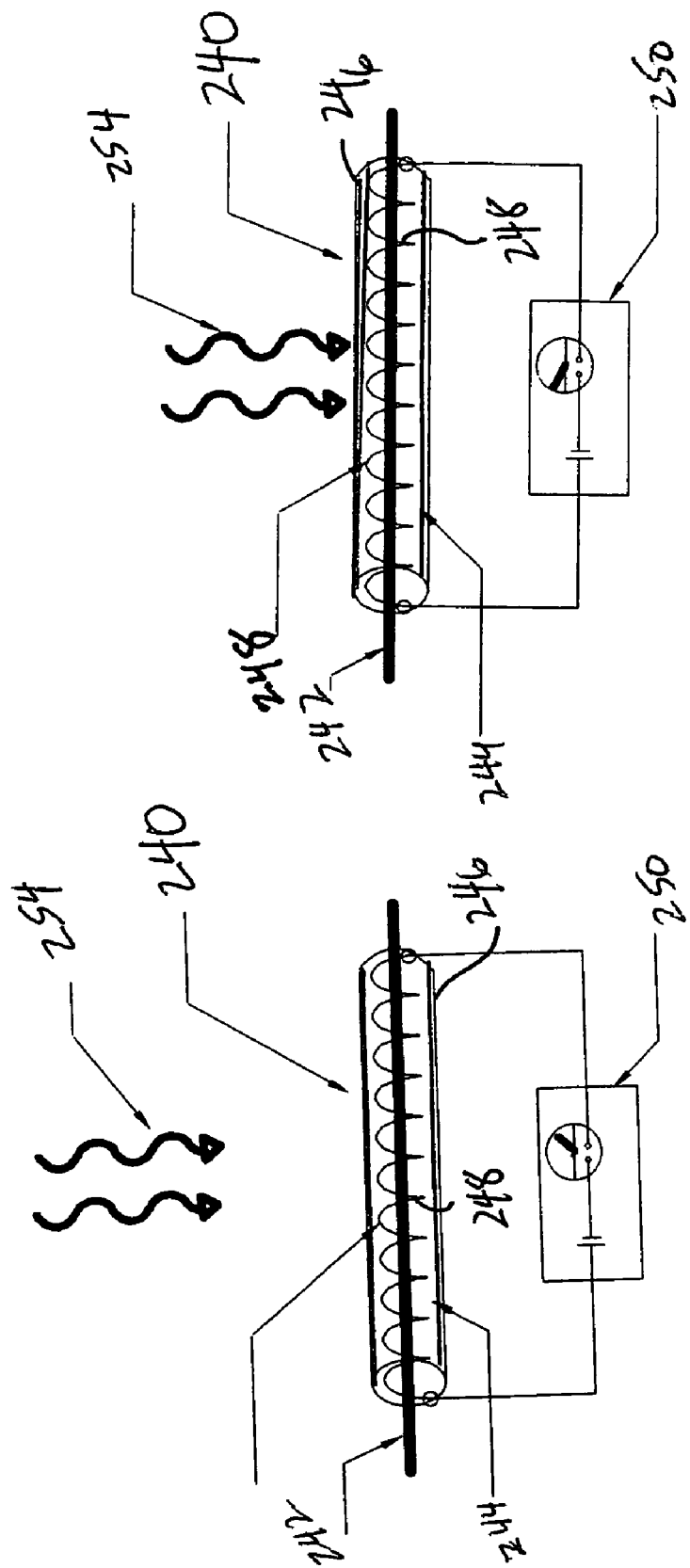

ELECTRICAL SAFETY DEVICE FOR TEMPERATURE CONTROL AND MECHANICAL DAMAGE

FIELD OF THE INVENTION

This invention is directed to the field of electrical safety devices to provide temperature control and detection of mechanical damage, more particularly to an improved device of a number of prior art patents.

BACKGROUND OF THE INVENTION

The present invention relates to improvements, resulting in increased efficiency, of U.S. Pat. Nos. 5,541,803; 6,559,437; and RE 38,714, by the inventor hereof, where the contents thereof are incorporated herein in their entirety. Briefly, the several prior art inventions relate generally to an electrical safety device and more specifically to a temperature control device utilizing a sensing conductor to provide over temperature and mechanical damage protection for extension cords, electrical cords, and electrical components. The sensing conductor is housed within electrical power cords, cables and components so as to sense temperature changes or mechanical damage over a length of the electrical cable or over the surface of the electrical component case or internal parts.

Electric powered devices are subject to numerous conditions which can result in fire, injury by burning, injury by shock or release of toxic fumes. For example, aging or mechanically damaged electrical insulation results in local shorts and overheating due to large currents. Another frequent cause of overheating in electric motors is mechanical overload or stalling resulting in excessive current. Electrical or electronic devices which are fan or conduction cooled will overheat if the cooling medium or transport method fails. A safe, reliable and inexpensive safety device is needed to sense dangerous electrical conditions such as overheating and mechanical damage which threaten life and property.

Numerous devices for sensing over temperature conditions have been previously disclosed and claimed. Up to now, these safety devices have not enjoyed widespread use due to cost, complexity, electrical or mechanical limitations as well as safety concerns for the device itself.

Some previously disclosed safety devices depend on over-current protection to sense overheating or fire. This type of protection may not be effective for all parts of a device, especially if the problem is mechanical damage, such as the breaking of some of the strands of a current carrying wire or a defective electrical connection due to corrosion or poor contact. A section of the device or cord may become dangerously overheated without tripping the overcurrent protection device.

Other safety devices sense the temperature at points along the electric cord or at points within the electrical component. For example, fusible links which melt and open a circuit upon over temperature conditions have been used. Other devices employ thermistors, RTD's or other temperature sensitive elements which, in conjunction with a sensing and control circuit, monitor temperature of the sensor and reduce or cut power to the device if the sensor overheats. Because these devices detect overheating conditions only at certain points, the safety devices protect only discrete locations; dangerous overheating conditions at other unprotected points may go undetected. In addition, protection of a long electrical cord or a number of components is not practical using thermistors, RTD's or junction devices due to weight, bulk, and cost.

Linear sensing means provides protection over a continuous length, thereby sensing safety problems over the length of the electrical cord. Linear sensing means can potentially reduce weight, bulk and cost in many applications. However, linear sensing has several drawbacks. If electrical impedance change in a conductor as a function of temperature is used in the sensing method, a large temperature change in a short length of the conductor is equivalent in impedance change to a small temperature difference for the entire length. This leads to difficulties if the sensing circuitry is made sensitive enough to respond to a localized high temperature condition; a small ambient temperature change will cause unwanted alarm, or trip of the unit.

Safety devices which detect temperature over a distance have been used in applications such as electric heating blankets or in high voltage transmission lines. Some linear detection devices utilize specialized dielectric coatings between conductors which change electrical characteristics as a function of temperature, but these materials add to the cost, complexity, and, in some cases, reliability problems due to environmental, mechanical or aging effects on these materials. Other linear detection devices utilize line voltage AC applied to the sensor wire which can present a safety hazard for electric shock. These safety devices which detect over temperature over a distance are not designed to detect mechanical damage which could lead to shock or fire dangers. The above referenced prior art patents, but especially the improvements hereof, teach a more efficient mechanism for achieving the goals of this invention, as will become clearer in the following specification.

SUMMARY OF THE INVENTION

The present invention covers an improved tripping mechanism that improves the performance of the basic electrical safety system of the prior art, such as by way of example U.S. Pat. No. 5,541,803. Specifically, the improved system hereof addresses the need for a safety device for electrical components which can sense either over temperature conditions or possible dangerous mechanical damage to the component over a wide area. The basic system consists of a continuous loop of a low cost sensing conductor, such as simple copper wire, positioned in the electrical component so that at least part of the conductor loop is positioned between an energized part of the electrical component and the outside surface of the component, a reference conductor placed to sense ambient temperature and a sensor/controller unit.

Power for the electrical component to be protected is supplied from a power source through the sensor/controller unit. The sensor/controller unit comprises two circuit functions. The sensor circuit measures the difference between the resistance of the sensor and reference conductors by imposing a low voltage potential across the conductors. The controller circuit de-energizes the electrical component when the difference in resistance of the sensor conductor and the reference conductor reach a predetermined value, as would be caused by an over temperature condition of the electrical component as sensed by the sensor conductor.

The position of the sensor conductor also results in a high probability of sensor conductor breakage if the electrical component is damaged. The sensor/controller senses this breakage as loss of continuity (high resistance) of the sensor conductor and interrupts power to the electrical component. This additional personal/property protection is provided to reduce the possibility of exposure to energized parts.

The improved tripping mechanism employs a thin metallic foil, such as aluminum, helically wound about an insulated conductor, where said metallic foil is more quickly responsive to mechanical damage and over temperature conditions to thus shut-off operation of the electrical device to be monitored by said tripping mechanism.

Accordingly, a feature of this invention lies in the provision of an improved tripping mechanism to more quickly respond to mechanical damage and high temperature conditions.

Another feature of this improved invention is the use of a thin aluminum foil within the tripping mechanism to ensure a quick response to potential problems.

These and other features of the invention will become clearer in the description and accompanying drawings which follow.

BRIEF DESCRIPTION OF DRAWINGS

FIGS. 1-21 illustrate details of the basic electrical safety device according to the prior art, whereas Figures X-Y illustrate details of the improved tripping mechanism of this invention:

FIG. 1 is a block diagram of the electrical safety device;

FIG. 2 is a schematic diagram of the preferred embodiment of the present invention;

FIG. 3 is a schematic diagram of an alternative embodiment of the present invention;

FIG. 4 is a perspective drawing showing a method of placement of the sensing conductor in a power cord;

FIG. 5 is a cross-section of FIG. 4;

FIG. 6 is a perspective drawing showing another method of placement of sensor conductor in a power cord;

FIG. 7 is a cross-section of FIG. 6;

FIG. 8 is a perspective drawing showing yet another placement of sensor conductor in an electrical cord;

FIG. 9 is a cross-section of FIG. 8;

FIG. 10 is a perspective drawing showing still another placement of sensor conductor in an electrical cord;

FIG. 11 is a cross-section of FIG. 10;

FIG. 12 is a perspective drawing showing yet another placement of sensor conductor in an electrical cord;

FIG. 13 is a cross-section of FIG. 12;

FIG. 14 is a perspective drawing showing the preferred embodiment of the invention adapted to an electrical extension cord;

FIG. 15 is a detail cutaway of FIG. 14 showing the location of sensor conductors disposed in the insulated portion of cord;

FIG. 16 is a cutaway detail of the extension cord receptacle of FIG. 14;

FIG. 17 is a perspective drawing showing the present invention utilized in an appliance;

FIG. 18 is a cross-section of the appliance cord of FIG. 17;

FIG. 19 is a perspective drawing showing the present invention utilized in an electronic component;

FIG. 20 is a cross-section of the case wall of FIG. 19;

FIG. 21 is a perspective drawing showing the use of the present invention in an ornamental light string.

FIG. 24A is a simplified schematic illustration similar to FIG. 23A, where the mechanism may be subject to heat damage to the mechanism.

FIG. 24B is a simplified schematic illustration similar to FIG. 24A, where the heat source is in close proximity to the conductor and the metallic foil detects a temperature rise to a predetermined level, where said predetermined level is detected by the sensor turning off the electrical device.

DETAILED DESCRIPTION OF PREFERRED EMBODIMENT

The present invention relates to an improvement for monitoring temperature and mechanical damage to electrical systems, where said improvement is represented by a new tripping mechanism for use in combination with a prior art electrical safety device as exemplified by U.S. Pat. No. 5,541,803, to the inventor hereof.

Figure 1:
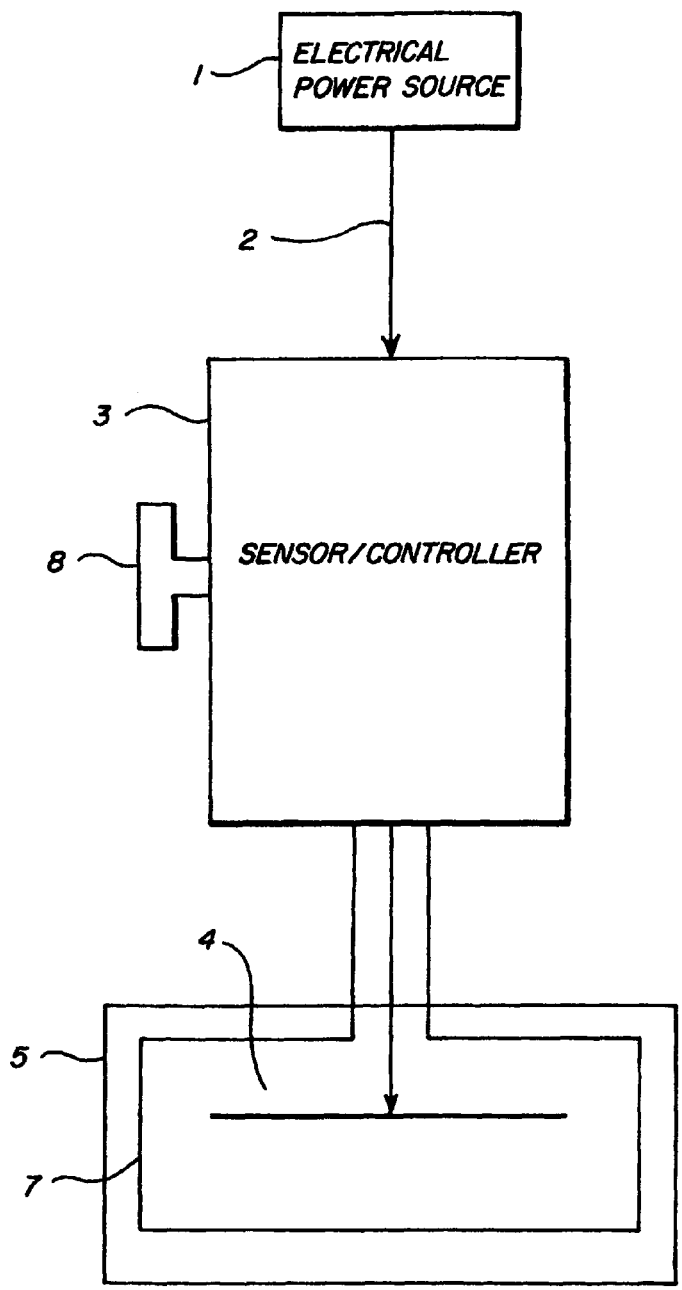

Turning first to the prior art device, FIG. 1 is a block diagram showing an electrical power source 1 which supplies line voltage 2 to sensor/controller 3. Sensor/controller 3 in turn supplies power to a current carrying means 4 in protected electrical component 5. Sensor conductor 7 is positioned between the current carrying means 4 and an outside surface of electrical component 5, and forms a continuous loop connected to sensor/controller 3. Reference conductor 8 is also connected to sensor/controller 3 and is positioned to sense ambient temperature of the electrical component. Both sensor conductor 7 and reference conductor 8 are chosen to have a similar temperature coefficient of resistance. Sensor/controller 3 comprises a means to measure the difference in resistance of the sensor and reference conductors by producing a low voltage potential across the conductors. Low voltage is meant to be a potential which will not result in a substantial shock hazard (nominally less than 30 volts), but in its preferred embodiment, the potential is less than one volt. When the difference in resistance of the sensor and reference conductor reaches a set value (representing an overheated condition of the sensor/controller) interrupts power to the current carrying means of the electrical component. In the preferred embodiment, power remains interrupted until the over temperature condition is removed and the sensor/controller is reset by the user. The sensor/controller also includes a means which detects continuity of the sensor conductor and interrupts power to the current carrying means 4 of the electrical device 5 upon loss of continuity.

The location of sensor conductor 7 is critical to the operation of this prior art device. Placed between an energized wire or part of the protected electrical component and the outside surface of the protected device, the sensor conductor performs two separate safety functions. First, it senses an over temperature condition whether from inside or outside the protected device, and, secondly, the sensor conductor placement results in a high probability that the sensor conductor will be broken as a result if physical damage such as shock, trauma, cutting, deterioration, or corrosion to the protected component prior to the energized wire or part being exposed. Since the sensor/controller detects loss of continuity, the protected electrical component will be deenergized before the energized wire or part is exposed. The gauge or thickness of the sensor conductor as well as the sensor conductor material and placement in the protect device are chosen to increase the probability of sensor conductor breakage upon one of the aforementioned conditions. Safety is further improved by use of a low voltage applied to the sensor conductor, so that even if exposed or touched, the sensor conductor will not present a shock hazard.

It is necessary for at least a portion of the sensor conductor to be placed between the current carrying element, or energized wire or part of the protected electrical component, and an outside surface of the protected electrical component. In one embodiment a substantial portion of the sensor conductor is placed in this position to increase the length of sensor conductor that is in a protective position as described earlier. Ideally, multiple paths and loops of continuous sensor conductor would be distributed in the protected component as described, so that the maximum amount of the protected device is protected from overheating. Any feasible mishandling or damage to the device would result in breakage of the sensor conductor and the resulting de-energizing of the component. Another benefit of increased length or the sensor conductor is that the impedance of the sensor conductor loop is increased, reducing the current requirements of the device for a given reference voltage maintained across the bridge circuit of the embodiment discussed later.

Likewise, the placement of the reference conductor is important to the operation of the device. Ideally, the reference conductor senses only ambient temperature and therefore would be located remote from the rest of the protected component. Often this is not practical, especially in consumer electrical equipment, so the reference conductor could be located on the component or piece of equipment in a position which would sense ambient temperature and be in a location away from possible heat producing parts of the component. This may commonly be on an outside surface, such as the back or bottom of the component.

Figure 2:
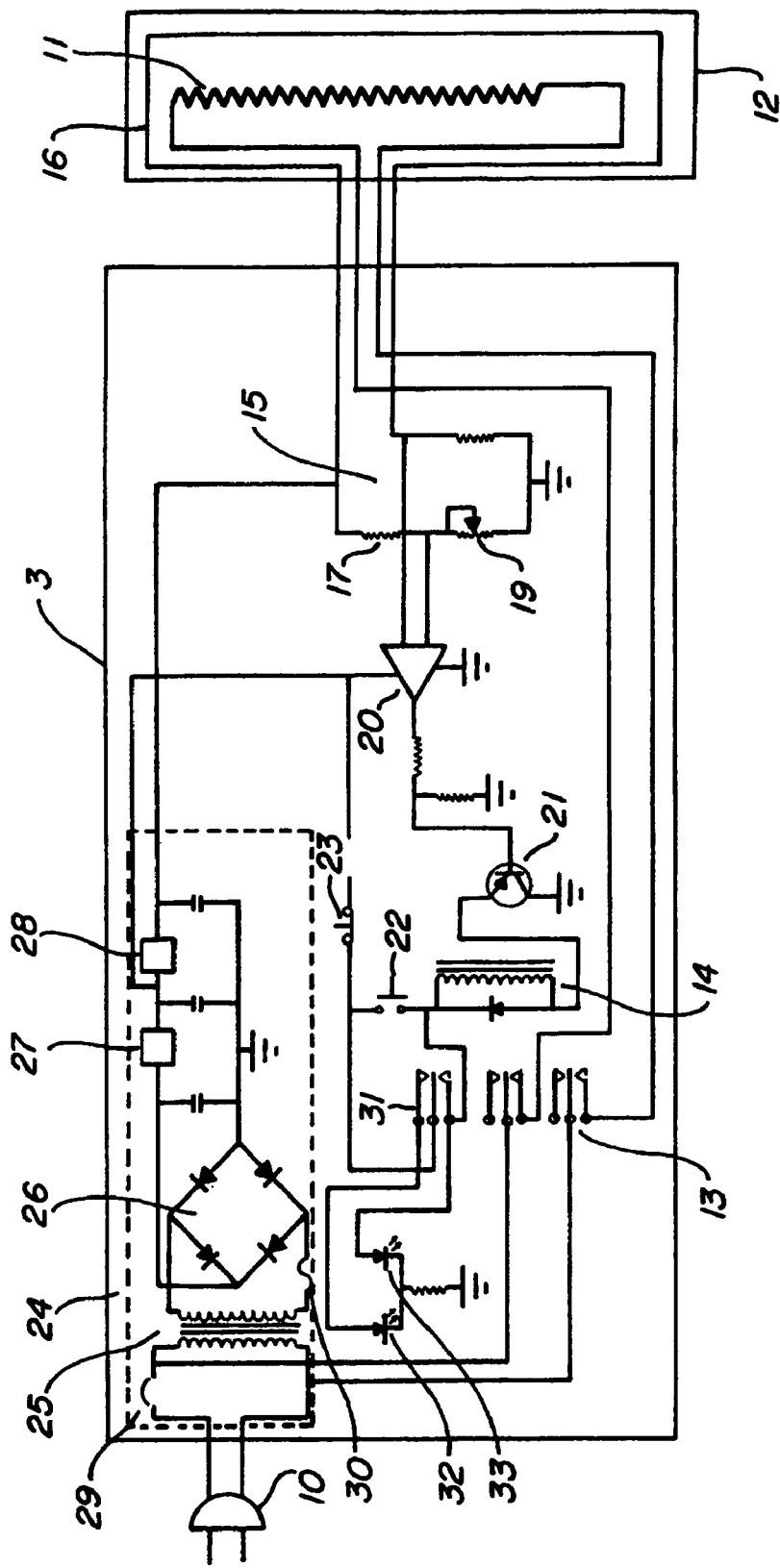

FIG. 2 shows a schematic diagram of the preferred embodiment of the prior art invention. AC line voltage is supplied from AC plug 10 to a current means 11 of electrical component 12 through an interrupting means (control contacts 13 of protective relay 14.) Sensor conductor 16 disposed substantially between the current carrying means 11 and the surface of the electrical component 12 consists of a conductor, such as copper wire with a positive temperature coefficient of resistivity and forms one leg of a bridge circuit 15. Reference conductor 17, a conductor with a similar temperature coefficient of resisitivity as the sensor conductor, forms a second leg to bridge circuit 15. Output of the bridge 15 is connected to an operational amplifier or comparator 20 whose output energizes or de-energized control relay 14 through relay driver 21. Control relay contacts 31 latch control relay 14 in the energized position and control indicator LEDs for "tripped" 32 and "ON" 33. Momentary "ON" switch 22 turns on electrical component 12 and momentary "OFF" switch 23 trips or turns off the component 12. Momentary "ON" switch 22 also ensures that the device has to be manually "reset" to restore current to the electrical component after a trip condition. Variable conductor 19 is used to adjust the trip point of the device by balancing or unbalancing the bridge circuit 15 as required. Power supply 24 comprises a circuit breaker or fuse 29 for load protection, isolation transformer 25, bridge rectifier 26 and voltage regulators 27 and 28. Voltage regulator 27 supplies circuit and control voltage to the operational amplifier, driver, relay and indicator circuits and is typically 5-12 VDC. Voltage regulator 28 supplies a regulated voltage to the bridge circuit and is typically less than one volt.

The location of sensor conductor 16 and reference conductor 17 in bridge 15, and the connection of operational amplifier 20 and relay driver 21 are chosen so an increasing temperature at sensor conductor 16 results in de-energizing control relay 14 and therefore de-energizing the current carrying means of electrical component 12. This arrangement ensures "fail safe" operation upon loss of power supply 24, or failure (opening) of sensor conductor 16, operational amplifier 20, relay driver 21, or control relay 14. The use of a sensor conductor with a positive temperature coefficient of resistivity in this arrangement also acts as a continuity sensor in that a break anywhere in the sensor conductor loop will result in a "high" resistance as sensed by the bridge circuit and open control relay 14, thereby de-energizing the protected component.

A fault in the sensor/controller module 31 could be protected by a portion of the sensor wire embedded in the module 31. However, depending on its location, the reference conductor 17 may become overheated as well, thereby preventing a sensor conductor 16 induced thermal trip. To give additional protection for such a case, a fusible link 30 is included in the module to turn off the module 3 and electrical component 12 upon module over temperature.

Figure 3:
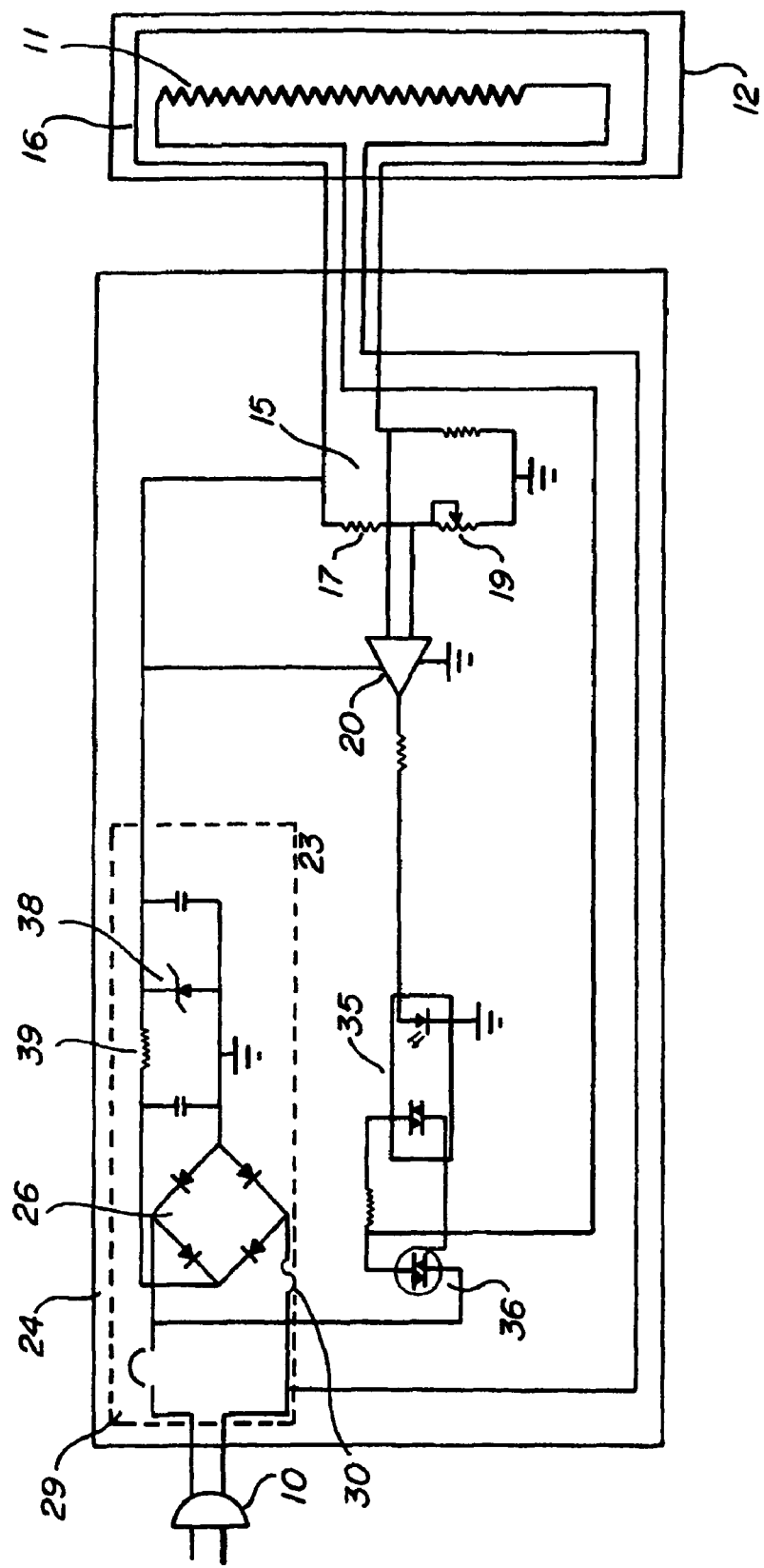

FIG. 3 is an alternative embodiment of the prior art device. A solid state switch such as a triac 36 is used to interrupt the current carrying means 11 of electrical component 12. The triac is controlled by the output of operational amplifier 20 through an isolated solid state coupler such as an opto-coupler 35. Low voltage DC for the bridge circuit 15 and operational amplifier 20 is supplied through a rectifier bridge 34, solid state breakdown device such as a zener diode 38, and dropping resistor 39. This device could be used in a control application because no manual reset is required to restore current to the electrical component 12.

Figure 4:
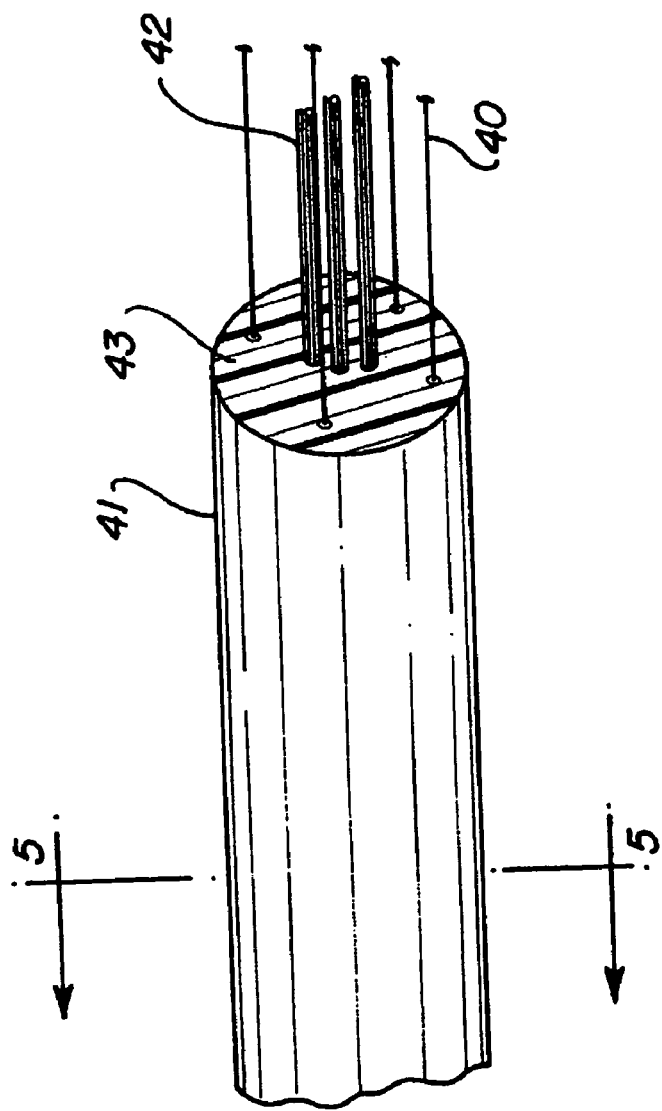

FIG. 4 shows a method of placement of the sensor conductor 40 in a power cord 41. The sensor conductor 40 is parallel to current carrying conductors 42 and located in the insulation portion 43 between the current carrying conductors 42 and the outside of the insulation. The sensor conductors 40 are connected at the ends to form a continuous loop at one end (not shown).

Figure 5:
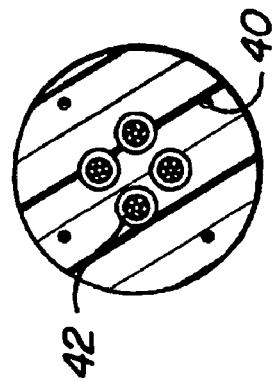

FIG. 5 is a cross-section of FIG. 4 showing placement of sensor conductors 40.

FIG. 6 shows another method for the placement of sensor conductor 60 in a power cord 61. Sensor conductor 60 is fashioned in a "sinusoidal" or "snake" pattern in the insulation portion 62 of the power cord 61 between the current carrying conductors 63 and the outside of the power cord 61. The particular shape of the sensor conductor placement increases the flexibility of the power cord and reduces the possibility of inadvertent damage to the sensor conductor due to normal handling and use of the cord.

FIG. 7 is a cross-section of FIG. 6 showing placement of sensor conductor 60.

FIG. 8 shows yet another placement of sensor conductor 80 in an electrical cord 81. Sensor conductor 80 is wound in a helical shape and placed parallel to current carrying conductors 82 in the insulated portion 83 of the cord 81 between the current carrying conductor 82 and the outside of the cord 81. The particular shape of the sensor conductor placement increases the flexibility of the power cord and reduces the possibility of inadvertent damage to the sensor conductor due to normal handling and use of the cord.

FIG. 9 is a cross-section of FIG. 8 showing placement of sensor conductor 80.

FIG. 10 shows still another placement of sensor conductor 100 in an electrical cord 101. Sensor conductor is wound in a helical shape surrounding current carrying conductors 102 in the insulated portion 103 of the cord. A second sensor conductor 104 is shown in the center of the cord to allow forming a continuous loop from one end of the cord. The particular shape of the sensor conductor placement increases the flexibility of the power cord and reduces the possibility of inadvertent damage to the sensor conductor due to normal handling and use of the cord.

FIG. 11 is a cross-section of FIG. 10 showing placement of sensor conductors 100 and 104.

FIG. 12 shows yet another placement of sensor conductor 120 in an electrical cord 121. Sensor conductor 120 consists of a conductive elastomer which is extruded as separate strips in the insulation portion 122 during manufacture. The sensor conductor 120 is parallel to, and located between current carrying conductor 123 and the outside of electrical cord 121.

FIG. 13 is a cross-section of FIG. 12 showing location of sensor conductor 120.

FIG. 14 shows the preferred embodiment of the prior art invention adapted to an electrical extension cord. Plug-in module 140 contains the sensor/controller circuitry (not shown), AC plug ends 141, "ON/RESET" switch 142, "OFF" switch 143, "ON" LED 144 is a cross-section of FIG. 4 showing placement of sensor conductors 40.

FIG. 15 is a detail cutaway of FIG. 14 showing the location of sensor conductors 150 disposed in the insulated portion of cord 147 between cord conductors 151 and the outside of cord 147.

FIG. 16 is a cutaway detail of the extension cord and receptacle 148 showing the sensor wire 160 disposed in the insulated body portion of the receptacle between the receptacle conductors (not shown) and the outside surface of the receptacle. The sensor conductor 160 is connected to form a continuous loop from the plug-in module end.

FIG. 17 shows the present invention utilized in an appliance. Sensor/controller module 170 is located inside the appliance. The power cord 171 is connected to the module and an insulated sensor conductor 174 is distributed on the inside surface of the appliance structure as well as on various stationary components such as the motor frame 173 within the appliance. Sensor wire 180 in power cord 171 (see FIG. 18) is connected with sensor conductor 174 in the appliance to form a continuous loop from the sensor/controller module 170. Power cord sensor conductor 180 is disposed in the insulated portion 182 of the power cord between the power conductor 181 and the outside of the power cord 171. The reference conductor (not shown) may be located on an outside surface of the appliance such as the bottom or back of the appliance.

FIG. 19 shows the prior art invention as utilized in an electronic component. Sensor/controller module 192 may be located on the chassis 191 or on the plug end (not shown). Sensor conductor 193 is disposed on the chassis in the vicinity of various components. A sensor ribbon 194 is bonded to the inside of the case 195 and forms a continuous loop with sensor conductor 193 when the case is attached to the chassis receptacle 196 by means of a case plug 197. FIG. 20 shows a cross-section of the case wall showing the sensor ribbon 193 bonded to the inside surface of the case wall 200.

Figure 21:
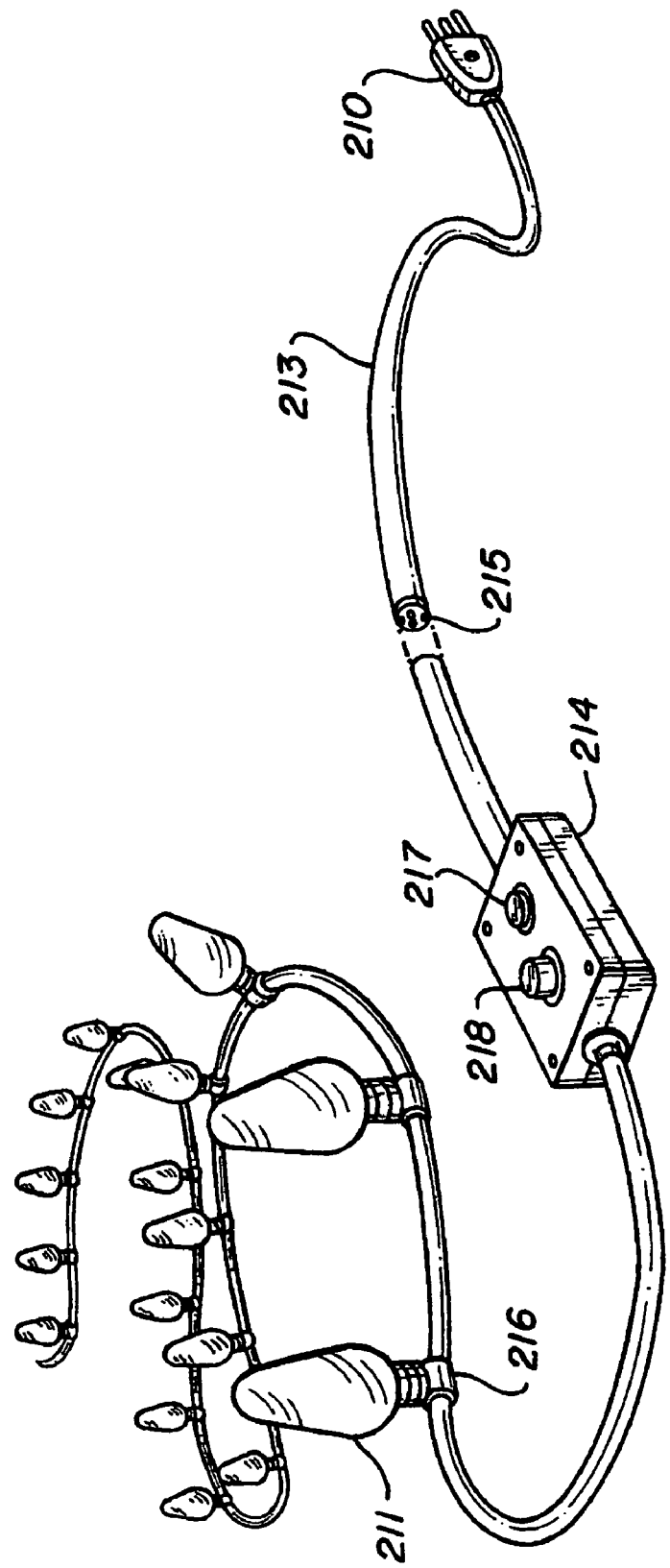

FIG. 21 shows the use of the prior art invention in an ornamental light string. Plug 210 supplies power to the lights 211 through cord 213 and sensor/controller module 214. Sensor conductors 215 are distributed in cord 213 and light sockets 216. Sensor/controller module 214 contains combination ON/RESET switch and indicator light 217 and combination off switch and trip light 218. Reference conductor (not shown) is located on the back of sensor/controller module 214.

Turning now to the specific improvements of this invention, as illustrated in FIGS. 22 through 24B, FIG. 22 is a schematic diagram for a complete electrical diagram of the preferred invention. This is an in-line device with a manual reset button that must be physically pressed by the user to turn the device back on if actuated by any of the various conditions, such as power surges or ground faults, temperature variations which could be caused by shorts or over loading conditions, mechanical damage, all of which may lead to a short circuit or possibly fire.

Figure 22:
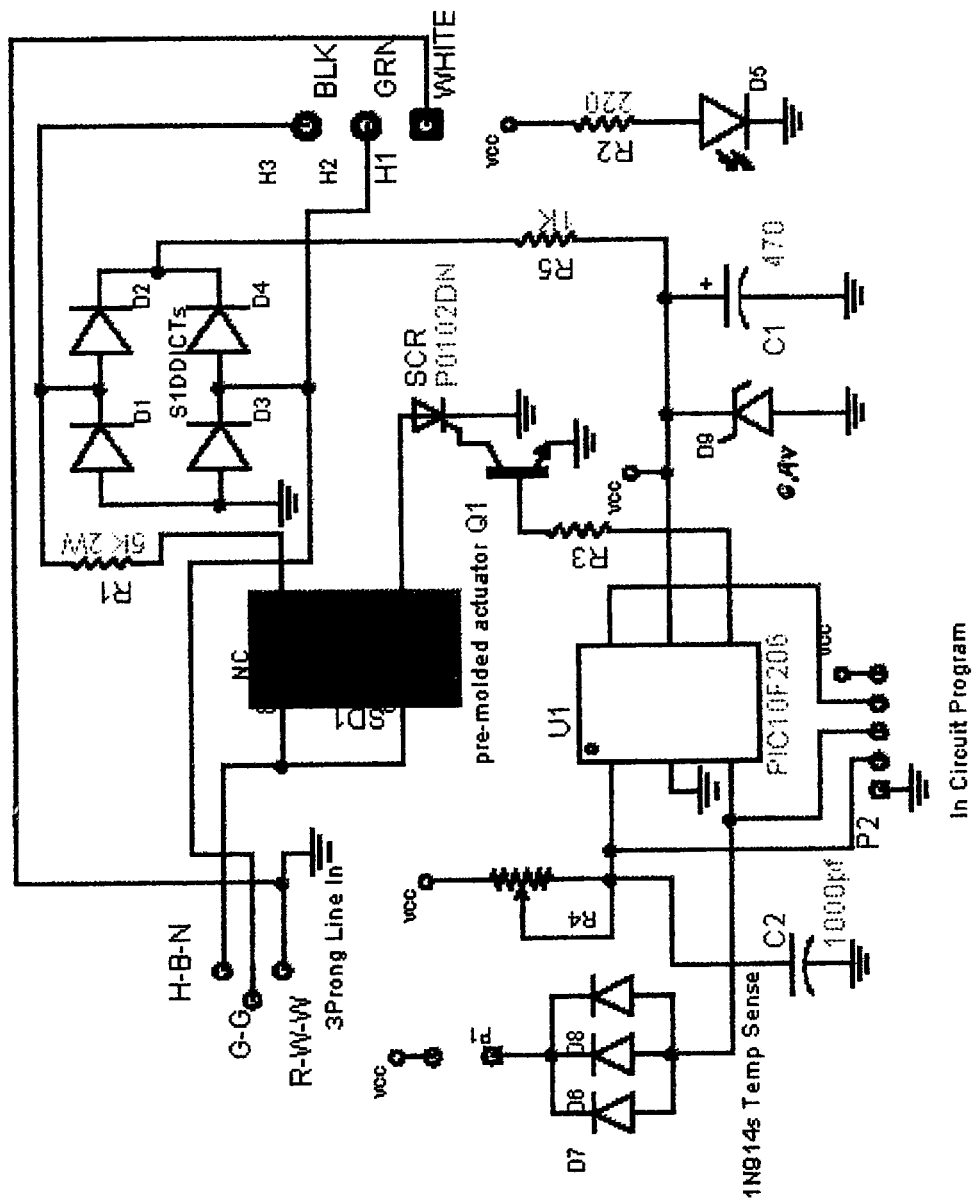
FIG. 22 is a schematic diagram of the electrical system of the improved invention hereof, to monitor the safety of an AC current passing through an electrical device.

The way the system hereof works may be powered from a typical AC outlet to monitor the safety of the AC current passing through the device. The hot side labeled (H-B-N) for Hot-Black wire-Narrow prong, is fed to Diode Bridge D1, D2, D3, and D4 through current limiting resistor R1. The output of the diode-bridge network is now fed through R5 used to smooth out the ripple frequency in conjunction with capacitor C1. This now DC voltage is fed to zener diode D9 which is used to lock down the voltage to a suitable supply for the microprocessor U1. This voltage designated as VCC in FIG. 22 is also used to set some reference points by creating a stable potential for other key areas of the circuit, which shall be discussed shortly. LED D5 is simply a power good signal which is on as long as the power conditions are safe. Premolded actuator SD1 is the manual push button reset switch.

The diodes D6, D7 and D8 are used as both a voltage reference point and a temperature sensing apparatus. They are ganged (in parallel) to add to the temperature sensitivity. They will also produce a 0.6 volt drop, which will be used as a reference for the processor's internal comparators. As with any comparator, an alternate source is needed to compare to it. This is established by variable rheostat R4 that will be factory set. This is the reason for jumper plug P1 that will be put in place for factory adjustment setup making voltage VCC, a direct connection to the 3 diodes just discussed. Now that R4 is set to threshold voltage level as the voltage drop across the diodes, there is a method to monitor any sudden disturbances in voltage level such as power surges or ground fault, etc. This is sensed through a phase relationship between the two comparator inputs. The input from R4 rheostat is connected to C2 which creates a time constant delay preventing the capacitor from charging to changed voltage level of power disturbance as quickly as the same voltage fed through the 3 diodes. It will take a few milliseconds for the capacitor to meet the same level as at the diodes. By this time the processors internal comparator will have detected the fluctuation due to its fast response time. With over temperature conditions, the diodes will change their resistance in a linear fashion thereby increasing or decreasing the voltage level at it's comparator input. This will usually always occur at a slower rate if it is a gradual shorting of an appliance that would be plugged up to the cord. This is where the programming of the processor is used to make decisions as to timing considerations and potential hazards due to over temperature. The programming can also setup new thresholds for its comparator inputs, so that if indoor and or outdoor are different enough that the factory settings are off due to diode resistance, it can quickly establish new comparator input levels. Any grounds or shorts or sudden fluctuations are acted on immediately through the processor's real time internal interrupts.

Once any potentially hazardous condition has been established, the processor will immediately place a high on it's output pin going to the base of Q1, which will turn on the transistor, causing the SCR to conduct via the gate pin connected to transistor Q1 collector. The SCR will conduct the AC voltage from the outlet but will only conduct in one direction effectively creating a large DC voltage potential across the solenoid of the manual reset button causing the actuator to trip the normally closed contacts (NC) to an open condition thereby de-powering the entire circuit including the throughput of the AC voltage from the AC outlet to the appliance by way of the cord.

The coupling wire used for sensing various electrical conditions can be no more than a thin strap wire of a gauge of (26) or smaller. Also the return path is through a unique helically wound foil (see FIG. 23A) which is used to break the circuit is the wire cable is physically damaged by any number of situations such as a rodent chewing on the cable or possibly a lawn mower has run over it or other type of machinery that could damage the wire cable. The helical winding is placed near the outside of the cable just beneath this plastic coating so as to be extra sensitive to these potentially hazardous situations in which case the circuit will also open and power will be cut off immediately.

Figure 23A:
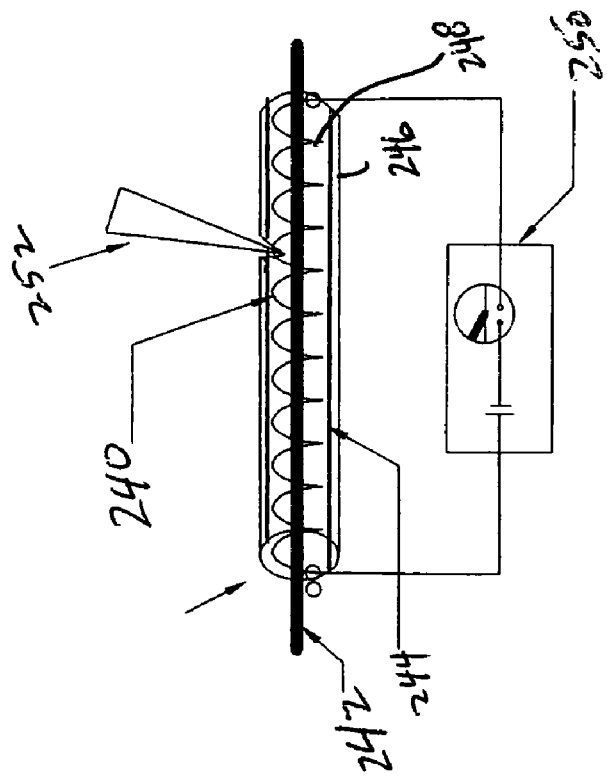
FIG. 23A is a simplified schematic illustration of the improved tripping mechanism according to the present invention where there is potential mechanical damage to said mechanism.
Figure 23B:
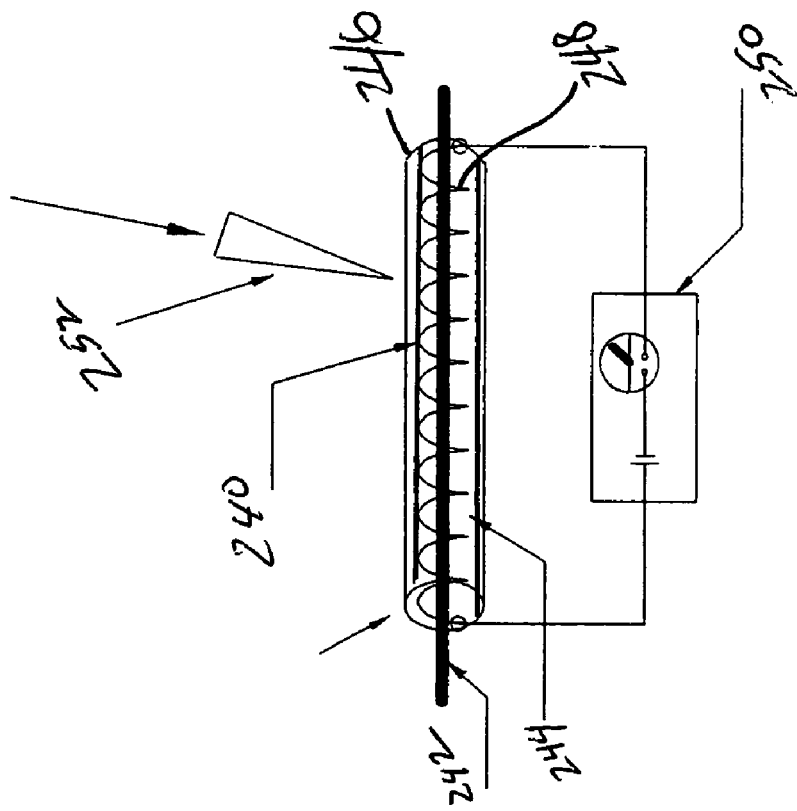
FIG. 23B is a simplified schematic illustration similar to FIG. 23A, where the mechanism has been penetrated severing the helical metallic foil causing a discontinuity in the foil which is detected by the sensor turning off the electrical device.

FIGS. 23A, 23b, 24A and 24B illustrate simple schematics of the tripping mechanism according to the improvements hereof. The tripping mechanism 240 comprises a copper conductor 242 surrounded by a first layer of insulation 244, a thin wrap of an outer insulative layer 246, and a thin, helically wound metallic foil 248, preferably aluminum foil, positioned about the first layer 244 under the outer insulative layer 246. Respective ends of said metallic foil 248 are electrically connected to a sensor 250 forming a continuous circuit. FIG. 23A shows a potential mechanical damage, in the form of a sharp edged blade 252, for example, close to the outer insulative layer 246. FIG. 23B shows the blade 252 penetrating said outer layer and severing the thin metallic foil. This breaks the continuity of the sensor circuit causing the sensor 250 to shut-down the electrical device being monitored. The thin foil or ribbon has the advantage of being severed under less pressure than a wire type shape.

Figure 25:
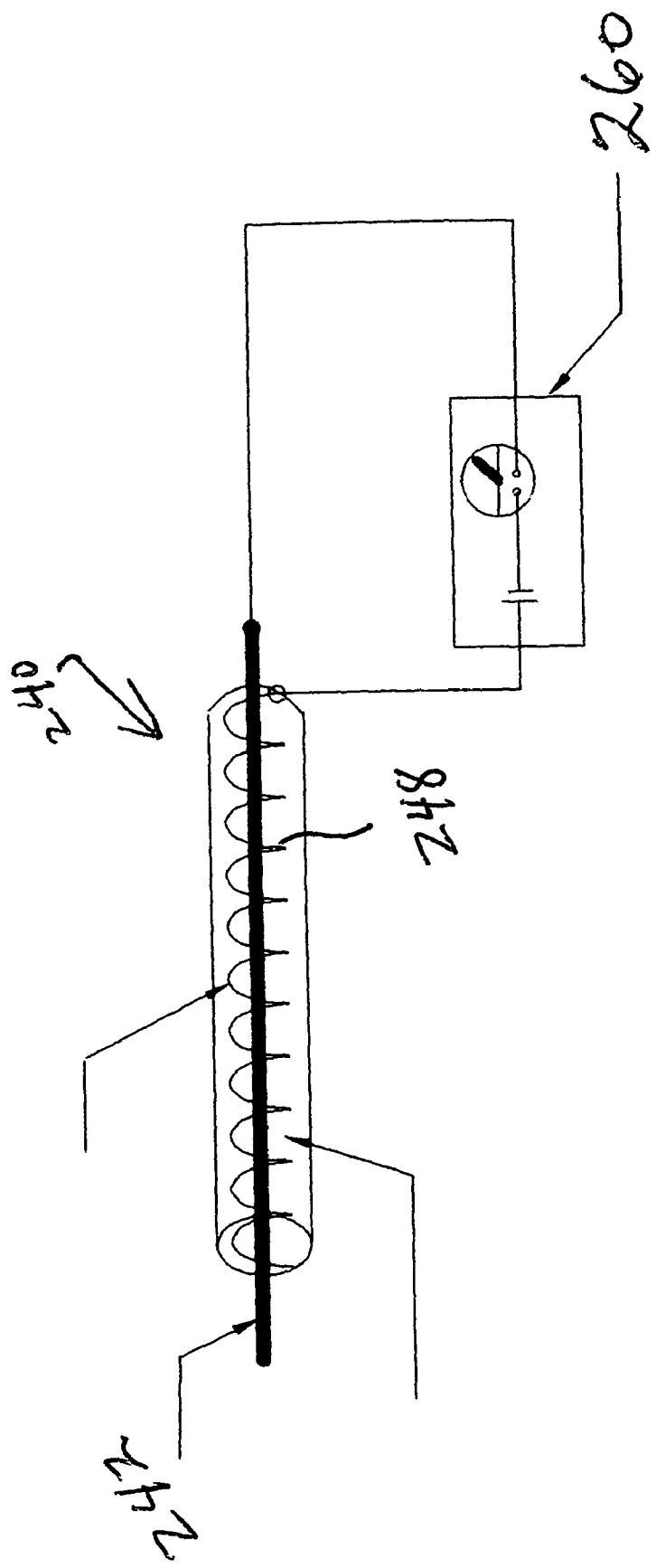
FIG. 25 is a simplified schematic illustration similar to FIGS. 23A-24B showing the use of a second sensor to measure current leakage between the conductor and metallic foil.

Another major problem to electrical devices is excessive heat. This problem is illustrated schematically in FIGS. 24A and 24B. FIG. 24A shows a potential heat source 254 spaced from the tripping mechanism 240. All is operational until the heat source 254 comes in contact with or in close proximity to the outer insulative layer 246. If the temperature reaches a predetermined or threshold level, the sensor detects the potential hazard of excessive heat and shuts-down the electrical device to be protected. By these arrangements the tripping mechanism more effectively responds to external problems and quickly shuts-down the electrical device to protect against further damage. In addition to mechanical and heat damage, as discussed above, a second sensor may be interposed in a circuit between the sensor foil strip and conductor to measure current leakage between the conductor and sensor foil strip, see FIG. 25. Note the additional sensor 260 is electrically connected in a loop between the conductor 242 and the wound metallic foil 248 to measure current leakage between said conductor and said metallic foil.

It is recognized that changes, modifications and variations may be made to the system of this invention without departing from the spirit and scope thereof. Accordingly, no limitation is intended to be imposed thereon except as set forth in the accompanying claims.

I claim:

1. In combination with an electrical safety device for detecting problems with an electrical system caused by partial shorts or over loading conditions, monitoring current fluctuations, temperature changes and mechanical damage in said system, said device comprising an electrical power cord comprising at least one current carrying conductor, insulation surrounding the current carrying conductor, and a cord outside surface;

a sensor conductor for sensing temperature in the electrical power cord, the sensor conductor disposed in the insulation of the electrical power cord as a continuous loop, the sensor conductor having a positive temperature coefficient of resistivity, and further disposed between the current carrying conductor and the outside surface and in a manner such that continuity of the sensor conductor is lost upon mechanical damage to the electrical power cord before the current carrying conductor is exposed, whereby the sensor conductor further comprises a continuity detecting means;

a reference conductor disposed in a vicinity of the electrical power cord for sensing ambient temperature; and, a control circuit connected to the sensor conductor and the reference conductor, the control circuit comparing a first electrical quantity representative of the sensor conductor temperature and a second electrical quantity representative of a reference sensor temperature and interrupting current to the current carrying conductor upon a predetermined difference between the first electrical quantity and the second electrical quantity;

an improvement comprising a tripping mechanism to facilitate monitoring problems, said tripping mechanism comprising a copper conductor encased within an insulative body and an outer insulative wrap, a continuous metallic foil helically wound about said copper conductor between said insulative body and said outer insulative wrap, and a sensor connected to said metallic foil to form a continuous loop, whereby any break in a continuity of said loop will be sensed by said sensor to turn off said electrical system.

2. The combination according to claim 1, said improvement including a manual reset means to render the device operational when said problem has been corrected.

3. The combination according to claim 1, wherein said metallic foil is a thin strip of aluminum.

4. The combination according to claim 1, said improvement further including a second sensor electrically connected in a loop between said conductor and said metallic foil to measure current leakage therebetween.

5. The combination according to claim 1, wherein a said problem is excessive heat in proximity to said encased conductor, and said sensor responds to said excessive heat to shut-down said device.

* * * * *